Patented June 5, 1928.

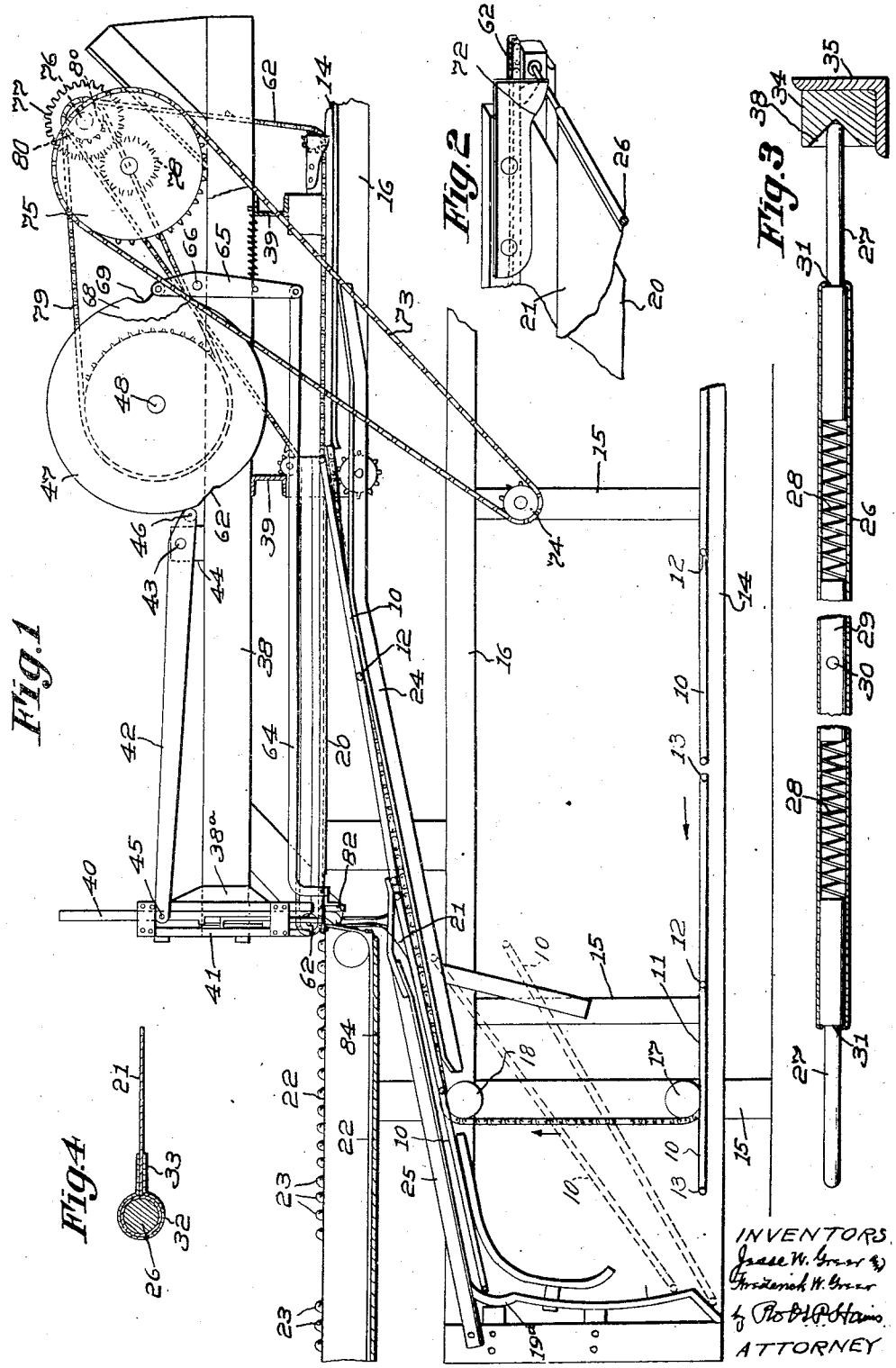

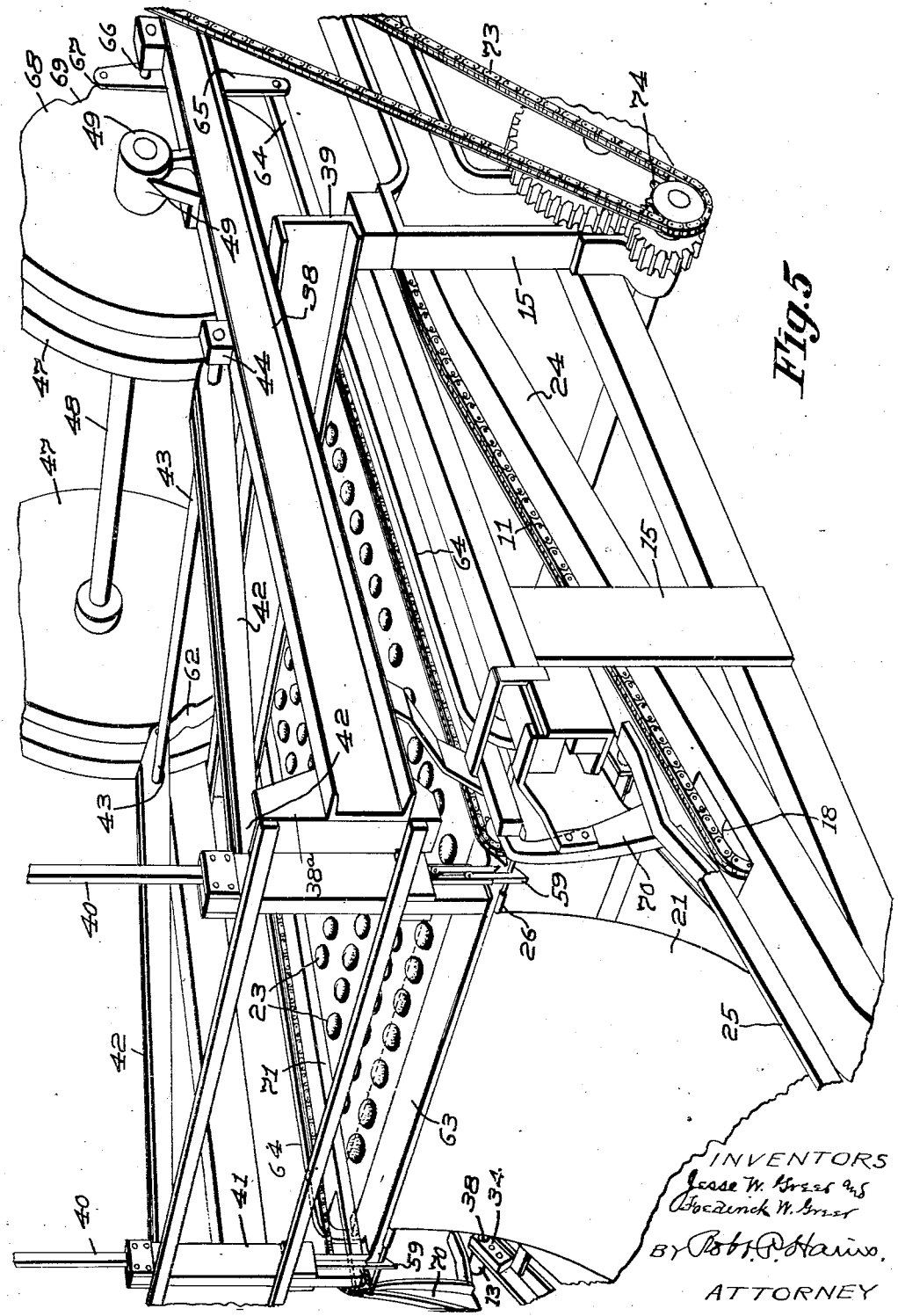

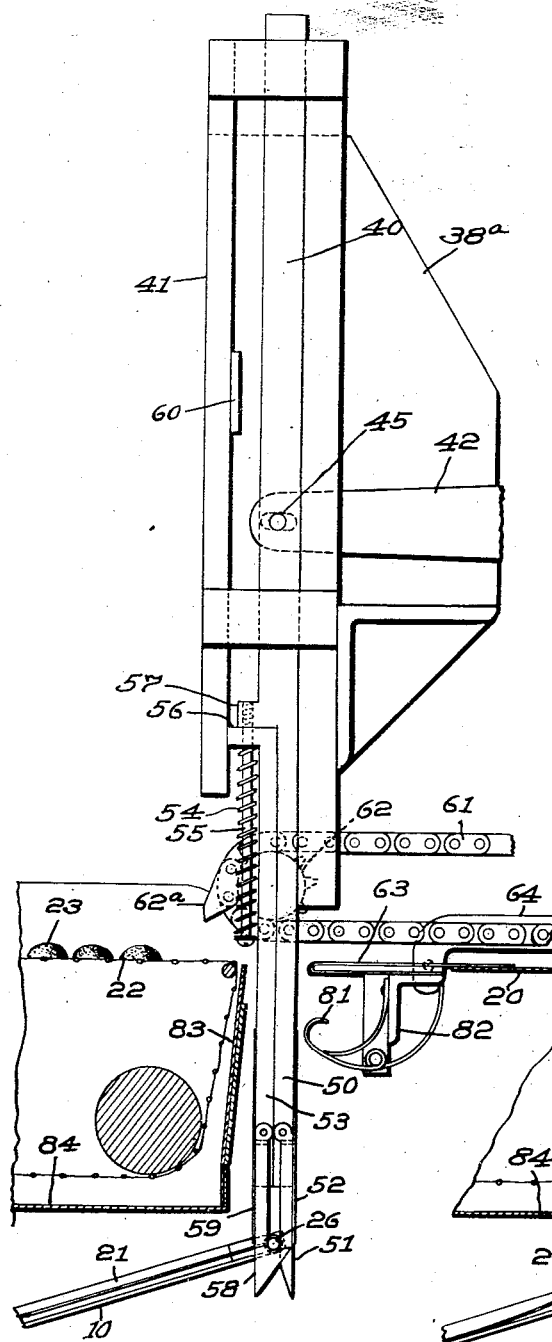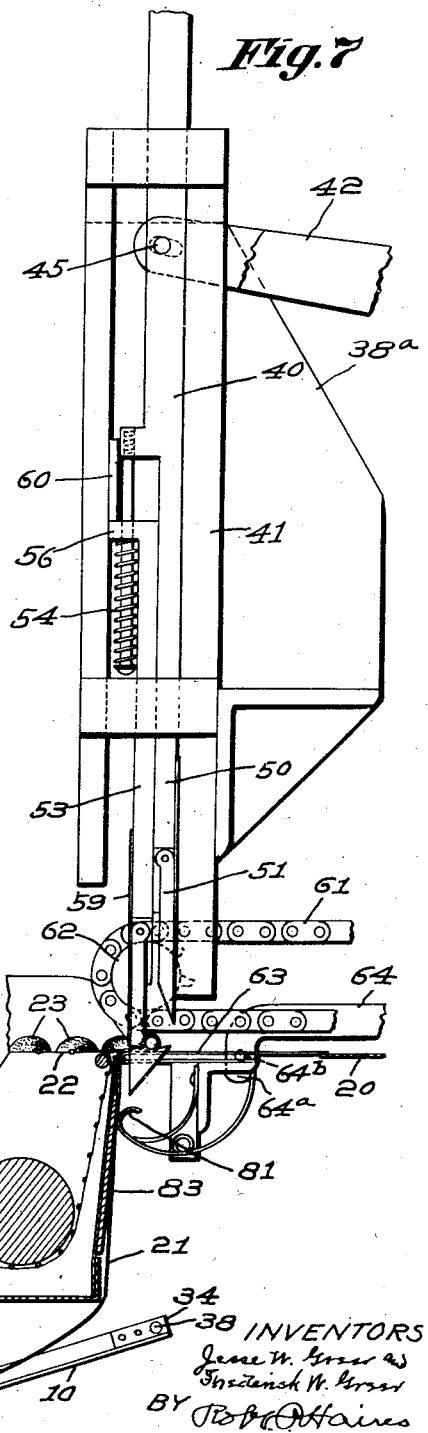

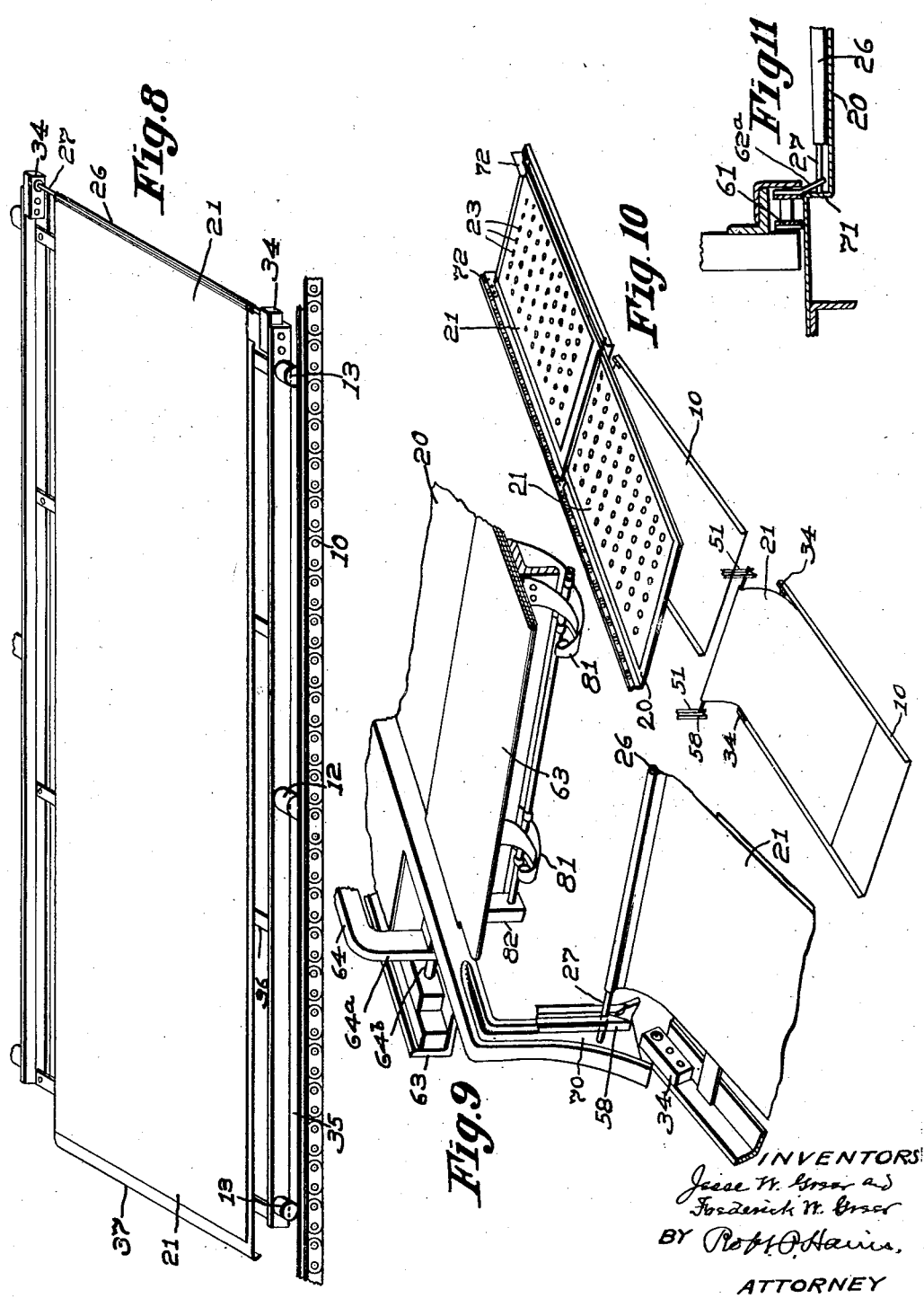

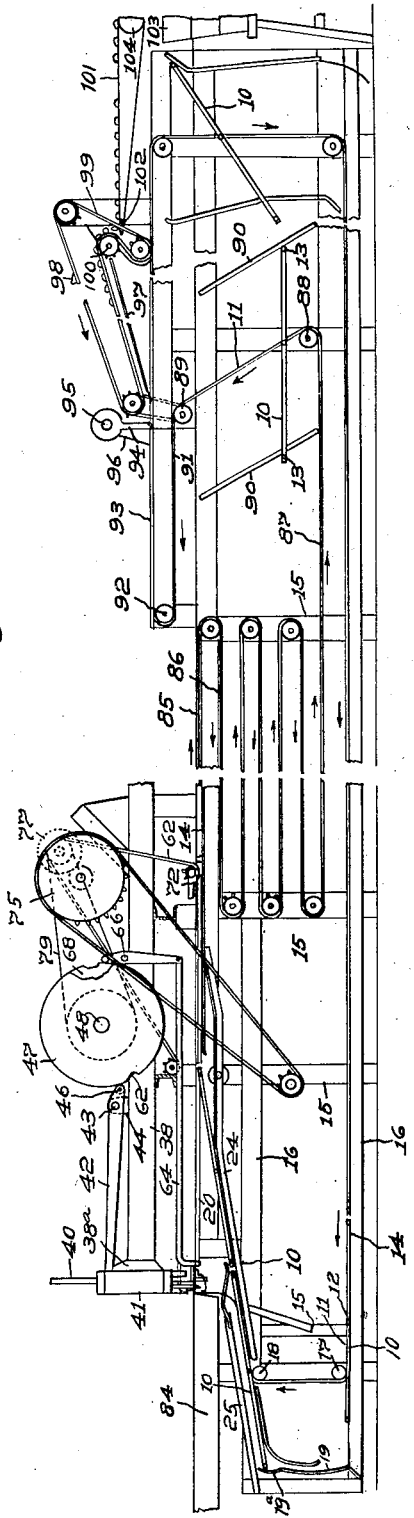

1,672,522

UNITED STATES PATENT OFFICE.

JESSE W. GREER AND FREDERICK W. GREER, OF CAMBRIDGE, MASSACHUSETTS.

CONFECTION-CONVEYING MACHINE.

Application filed May 25, 1926. Serial No. 111,506.

This invention relates to machines for conveying confections, and more particularly to means for transferring the confections from one conveying surface to another without breaking or marring the confections.

It is now the common practice in coating candies and cakes to place them upon an endless apron or belt which conveys them through a coating machine, and as they pass through this machine hot chocolate or other coating material is sprayed upon the confections. The coating upon the confections is in a hot soft condition as they issue from the coating machine, and they are therefore difficult to handle without injuring or marring the appearance of the coating.

It has been proposed heretofore to transfer the freshly coated confections to a long conveyor belt so that they may rest upon the upper run of the moving belt while the coating is cooled and hardened, but this proposed construction is open to the objection that the coating should be cooled slowly, which necessitates the use of a very long conveyor belt that occupies a large amount of floor space.

To overcome this difficulty it has been proposed heretofore to place the freshly coated confections on traveling trays instead of upon a belt, since the trays can be advanced along different runs while carrying the confections, and in this manner a compact form of conveyor for advancing the confections through a cooling chamber is secured, but difficulty has been experienced heretofore in devising satisfactory means for transferring the freshly coated confections from the conveyor of the coating machine to the trays of the cooling and drying machine.

Having the foregoing in mind, the present invention relates to machines for transferring freshly coated confections from a conveyor apron to the trays of a cooling and drying machine so that the confections are redeposited upon the trays during their continuous travel and without injuring or marring the soft, semi-liquid coating.

One important feature of the invention resides in plaques formed of paper or other flexible material to receive the confections, and which are constructed to be applied to and removed from the trays as the latter are advanced along their path of travel.

Another important feature of the invention resides in means for removing the plaques from the trays and for placing the confections upon the plaques while they are removed from the trays.

Another feature of the invention resides in means for placing the loaded plaques upon the trays.

In carrying out the present invention the trays are advanced under a plaque supporting surface one end of which is placed adjacent to the discharge end of an apron carrying the freshly coated confections. As the trays approach the plaque supporting surface the plaque upon each tray is engaged and drawn upward toward and around the edge of said surface, and the confections are placed upon the plaques as the plaques are drawn forward over said surface. In this manner each plaque is loaded as it travels along said surface and the loaded plaques are placed upon the trays as the latter pass out from under the surface. This is accomplished by securing the forward end of the plaque to the tray so that the movement of the tray serves to pull the plaque from the supporting surface onto the tray.

Still another feature of the invention resides in the construction whereby the confections are removed from the plaques after the trays carrying the confections have completed their travel through the drying and cooling chamber. This is accomplished by engaging the bars of the plaques as the trays reach a predetermined position, and lifting the bars sufficiently to direct the plaques over a supporting surface. In this manner the plaques are a second time temporarily removed from the trays, and after the confections have been removed from the plaques the latter are returned to their trays.

An extremely important feature of the present invention resides in the construction and arrangement of parts whereby the operations of removing the plaques from the trays, placing the confections upon the removed plaques and then returning the plaques to the trays, are performed during the continuous travel of the trays along their path of travel so that it is unnecessary to stop the movement of the series of trays in order to load or unload the trays.

The various features of the invention and novel combination of parts will be best understood from the following description when read in connection with the drawings which illustrate one good practical form of the invention.

In the drawings—

Fig. 1 is a longitudinal sectional view through part of a conveying machine constructed in accordance with the present invention.

Fig. 2 is a perspective view of means for attaching the forward end of a plaque to a tray;

Fig. 3 on an enlarged scale is a longitudinal, sectional view through a bar provided to attach a plaque to a tray;

Fig. 4 is a transverse sectional view through a bar showing the means for attaching the same to a plaque;

Fig. 5 on an enlarged scale is a perspective view of the construction shown in Fig. 1;

Fig. 6 on an enlarged scale is a side view of a plaque lifting hook and associated parts, the hook being shown in its lowermost position;

Fig. 7 is a view similar to Fig. 6, but shows the hook in its elevated position;

Fig. 8 is a perspective view of one of the trays having a plaque positioned thereupon;

Fig. 9 is a perspective view of parts shown in Fig. 5;

Fig. 10 is a diagrammatic view showing the construction whereby the plaques are passed over the plaque supporting surface while the trays are advanced under this surface;

Fig. 11 is a sectional view showing the means for advancing a plaque over the plaque supporting surface;

Fig. 12 is a side elevation of a tray conveying machine showing the confection loading mechanism of Fig. 1 at the left-hand end of the machine and the confection unloading mechanism at the right-hand end of the machine; and Fig. 13 is an enlarged side view of part of the unloading mechanism of Fig. 12.

The mechanism forming the subject matter of the present invention may be associated with various types of machines which are provided with trays that are advanced along an endless path, and one form of conveyor in connection with which the subject matter of the present invention might well be employed is disclosed in the Jesse W. Greer Patent No. 1,321,520, granted November 11th, 1919.

In the construction shown the article supporting trays 10 are advanced in the direction indicated by the arrow in Figs. 1 and 12 by the endless side chains 11 to which each of the trays is pivotally connected by the stub shafts 12. These stub shafts project from the opposite sides of the tray near the central axis of the same, as best shown in Fig. 8, and they are pivotally secured to the side chains 10 by any suitable construction. Near the opposite ends of each tray 10 are provided the projecting lugs 13 which are adapted to engage guide bars 14 disposed at the opposite sides of the conveyor frame. The guide bars 14 and the various operating parts may be supported by a frame of any suitable construction, and which is shown as having the uprights 15 which are secured to the longitudinally extending beams 16.

The drawings show the confection loading mechanism of the present invention as applied to the left-hand end of the conveyor having the traveling trays 10, and show the confection unloading mechanism as disposed near the right-hand end of the conveyor. As the trays 10 reach the left hand end of their lower run they are carried upwardly about the sprocket wheels or rollers 17 by the portion of the side chains 11 which pass upwardly and around the upper sprockets or rollers 18. It is desirable to tilt the trays as they pass upwardly from the lower to the upper guide rollers 18 as indicated in skeleton lines in Fig. 1 to cause their adjacent edges to clear each other. The edges of adjacent trays are disposed in close proximity to each other and these edges will strike each other when the direction in which the trays travel is changed unless care is taken to prevent this. The means shown for tilting the trays 10 consists of the curved guide bars 19 provided adjacent the left-hand end of the conveyor, as best shown in Fig. 1, and these guides are so positioned that they are engaged by the lugs 13 disposed at the left-hand end of the trays. The guides 19 are further desirable in that they serve to position the leading ends of the trays as the trays start to travel around the upper rollers and thereby facilitate engagement of plaque lifting means, to be described, with rods at the forward ends of the trays, and it should be noted that the upper portion of the guides 19 are provided with the curved parts 19ᵃ which facilitate positioning of the forward end of each tray.

A plaque supporting surface 20 is positioned above the upper run of the trays near the left-hand end of the conveyor, as will be apparent from Fig. 1, and in accordance with the present invention the plaque 21 upon each tray is engaged as its tray starts to pass under the plaque supporting surface 20, and the plaque is pulled upwardly and over the surface 20 while the tray to which it was secured passes under this surface. The plaques 21 may be formed of paper, cloth, or other relatively thin, flexible material, and they are preferably provided with a smooth, glazed surface upon which the confections or other materials to be conveyed are deposited.

In accordance with the present invention the left-hand end of the plaque supporting surface 20 is disposed in close proximity to the delivery end of the upper run of an endless conveyor or apron 22, which apron may constitute the endless conveyor which carries the confections 23 to be coated through the coating machine (not shown). As above stated the coating upon the confections 23 is in a soft sticky condition as these confections pass out of the coating machine, and care must therefore be exercised in transferring these confections from the conveying apron 22 to any other supporting surface, in order not to injure or mar the coating. The present invention therefore contemplates a construction whereby the freshly coated confections 23 are transferred from the upper run of the apron 22 to the plaques 21 as the latter pass over the plaque supporting surface 20. This is accomplished by leading the plaques 21 upwardly through a narrow slot provided between the left-hand end of the supporting surface 20 and the end of the upper run of the apron 22, as best shown in Fig. 7, and as a result of this arrangement the freshly coated confections pass smoothly from the discharge end of the conveyor apron 22 onto the plaque 21, as will be apparent from Fig. 7; and as a plaque is advanced over the upper face of the supporting surface 20, the desired number of confections 23 will be deposited upon the plaque by the conveyor apron 22.

It will be understood that while a plaque 21 is being advanced over the plaque supporting surface 20 by means to be described, the tray 10 from which this plaque was removed is being advanced under the supporting surface 20 along the inclined path defined by the guide bars 24 and 25, best shown in Fig. 1. The trays 10 travel along the inclined guideways 24 into close proximity to the under face of the plaque supporting surface 20 and then moving in a horizontal direction along the under face of said surface. The plaque supporting surface is preferably formed of thin material such as sheet metal, and while this surface may be supported at the opposite sides of the conveyor supporting frame, it is not supported at its right-hand end between the sides thereof, with the result that this thin sheet or supporting surface 20 rests directly upon the upper surface of a tray 10 as the latter moves out from under the right-hand end of the supporting surface. This construction is important because it permits the plaques 21, after the confections have been placed thereupon, to move smoothly over the right-hand end of the supporting surface 20 onto a tray as the latter slides out from under this surface, and as a result each loaded plaque is placed upon its tray without disturbing or injuring the freshly coated confections carried by the plaque.

In carrying out the present invention it is necessary to provide means for securing the plaques to and maintaining them in place upon the trays 10, and in the present case this is accomplished by securing the forward end of each plaque 21 to a bar 26 which bar in turn is secured to the forward end of a tray, as will presently appear. These bars serve not only to retain the plaques in place upon their trays, but serve also to provide means by which the forward ends of the plaques may be readily carried upwardly and over the upper face of the plaque supporting surface 20. In the present construction each bar 26 is provided with sliding plungers 27, as best shown in Fig. 3, which project from its opposite ends, and these plungers are urged to their extended position within the bar 26 by the coiled springs 28. One end of each spring 28 rests against the inner end of a plunger 27, while the other end of each spring abuts against a bar or the like 29 which may be secured in place in the hollow rod 26 by a pin 30. The plungers 27 are provided with projecting ends of reduced diameter whereby the shoulders 31 are formed and the plungers are retained within the bars 26 by crimping or bending the ends of the bars inwardly so that they will engage the shoulders 31. Various means might be provided for securing a bar to the end of a plaque 21, and this is accomplished in accordance with the present invention by folding a strip of adhesive tape 32 about the bar 26 so that the marginal portions 33 of the folded strip of tape may be forced firmly into engagement with the opposite faces of the plaque 21, as will be apparent from Fig. 4.

Various means might be provided for securing the opposite ends of a bar 26 to the forward end of a tray 10, and this is accomplished, in accordance with the present invention, by providing each tray 10 with the blocks 34 which are secured to the forward end of the tray at the opposite sides thereof, as will be apparent from Fig. 8. The trays 10, as shown in Fig. 8, are formed of the spaced angle irons 35 which are connected by the transversely extending braces 36, and the frame thus formed has a sheet metal surface 37 secured to its upper face and upon which the plaque 21 rests. Each of the blocks 34 is provided with a pocket or plunger receiving socket 38, as best shown in Fig. 3, and the ends of a rod 26 are frictionally held within the pockets 38 by the springs 28, as will be apparent from Figs. 3 and 8. As a result of this construction the rods 26 may be readily secured to and removed from the leading end of a tray 10.

As above pointed out, each plaque 21 upon being advanced to a predetermined position by its tray 10 is pulled upwardly away from its tray and over the plaque supporting surface 20, and this is accomplished during the continuous travel of the trays along their endless path. The confections are placed upon each plaque as it is advanced over the supporting surface 20, and the loaded plaque is then applied to its tray 10 by securing the rod 26 of the plaque to the forward end of the tray so that the movement of the tray will serve to pull the plaque off the supporting surface 20 onto the tray. The means for removing the plaques from the trays, advancing them over the supporting surface, and returning them to the trays will now be described, and the mechanism for carrying out these operations is supported by a frame which may consist of the longitudinally extending braces 38 which are secured to one or more transversely extending beams 39, and the supporting frame thus formed is mounted upon and is supported by the uprights 15 of the main conveyor frame.

The means constructed in accordance with the present invention for engaging the opposite ends of a rod 26 and for elevating the same consists of the posts 40 which are disposed at the opposite sides of the machine near the left-hand end of the supporting surface 20, and these posts are mounted in fixed heads 41 for vertical sliding movement, the heads 41 being supported by angle irons 38ª that are secured to the side beams 38. Sliding movement is imparted to the posts 40 by the rocking levers 42 which levers are fulcrumed upon the transversely extending shaft 43, the opposite ends of which are supported by the blocks 44 mounted upon the beam 38. The left-hand end of each of the levers 42 is operatively connected to a post 40 by a pin or the like 45, and the opposite end of each of these levers is provided with a roller 46 which rests against the face of an operating cam 47, which cams are mounted upon and are rigidly secured to the transversely extending shaft 48. The cam supporting shaft 48 has its opposite ends mounted in the bearing brackets 49 secured to the side beams 38.

The sliding posts 40 have the construction best shown in Figs. 6 and 7 wherein it will be seen that each of these posts has an integral, downwardly extending portion 50 of reduced width, and to the lower end of the portion 50 is pivotally mounted a finger 51 which is normally held in the position shown in Fig. 6 by a flexible blade or spring 52. Each of the posts 40 is provided with a bar 53 which is slidably secured to the post and rests against the reduced portion 50 of the post. The bar 53 is yieldingly held in its uppermost position by a coiled spring 54 which is coiled about a spring supporting bolt 55, and this spring is confined between the head of the bolt and a projection 56 at the upper end of the bar 53. The arrangement is such that the bar 53 is normally held by the spring 54 in its elevated position so that the upper end of this bar rests against the lug 57 on the sliding post. At the lower end of the bar 53 is pivotally secured the rod engaging hook 58, and this hook is normally held in the position shown in Fig. 6 by the flat spring 59. The arrangement is such that when the head 40 is lowered by the operating lever 42 to engage a bar 26 the springs 52 and 59 will permit the finger 51 and hook 58 to move laterally away from each other as the hook is moved into engagement with an end of the bar, as shown in Fig. 6. As soon as the opposite ends of the bar 26 have been engaged by the means just described, the posts 40 at the opposite sides of the machine are elevated to the position shown in Fig. 7, wherein it will be seen that the movement of the hook carrying bar 53 has been arrested by the engagement of the upper end of this bar with a stop 60 on the fixed head, the arrangement being such that the hooks while in this position support the rod 26 in a position to be transferred from the hooks to the plaque supporting surface 20. It will be noted from Fig. 7 that the upward movement imparted to the post 40 is sufficient to hold the lower ends of the pivoted fingers 51 above and out of engagement with the rod 26 so that the rod may be readily moved out of engagement with the supporting hooks. The means shown for moving the rod 26 out of engagement with the supporting hooks and for advancing the rods over the plaque supporting surface 20 consists of the side chains 61 which pass around sprockets 62 supported near the left-hand end of the plaque supporting surface 20, and these chains 61 are provided with the rod engaging fingers 62ª (see Fig. 11) which are adapted to engage the plungers at the ends of a rod, and advance the rod and plaque over the surface 20.

The construction shown in Figs. 6 and 7 is such that the hook operating posts 40 should be held in their uppermost position the greater portion of the time, and when a tray carrying a plaque that is to be removed reaches a predetermined position the posts should be quickly lowered to engage their hooks with the rod, and lift the same. In order to impart this quick movement to the posts 40 it will be noted that the operating cams 47 have the form of annular disks in each of which a relatively small notch 62 is formed, the arrangement being such that the disks will hold the levers 42 in their uppermost position throughout practically a complete revolution of the cams 47, but will impart a quick rocking movement to the levers as the notch portion 62 of each disk is moved into engagement with the roller 46.

As above stated it is desirable that the left-hand end of the plaque supporting surface be disposed in close proximity to the discharge end of the conveyor apron, but the construction should be such that the projecting end of the surface 20 will not interfere with the movement of a rod 26 upwardly in the space between the discharge end of the apron 22 and supporting surface just mentioned. In accordance with the present invention the left-hand end of the supporting surface 20 is provided with a sliding plate 63 which normally occupies the position in which this plate is shown in Fig. 7, but which is momentarily moved to the position shown in Fig. 6 in order that the hooks 58 may carry the rod 26 upwardly without striking the plaque supporting surface. The means shown for automatically moving the plate 63 from its normal position shown in Fig. 7 to the position shown in Fig. 6, consists of the sliding bars 64 disposed at the opposite sides of the machine, and which are provided with the downwardly extending ends 64ᵃ that are connected by pins 64ᵇ to the sliding plate 63. The desired sliding movement is imparted to the bars 64 by the rocking levers 65, which are pivotally supported by the shaft 66, and the lower ends of these levers are pivotally connected to the bars 64. The upper ends of each of these levers is provided with a roller 67 that rests against a second cam wheel 68 mounted upon the operating shaft 48, and these cam wheels, like the cam wheels 47, have the form of an annular disk in which a relatively small notch 69 is formed and which is adapted to impart a quick longitudinal shift to the sliding plate 63.

In order to prevent any possibility of a rod 26 escaping from the supporting hooks while it is being elevated, the guide bars 70 are provided at the opposite sides of the machine in position to engage the ends of the rod 26. These guide bars 70 serve also to force the plungers 27 at the ends of the rod inwardly so that these plungers will be held in their retracted position while the rod 26 is being advanced over the plaque supporting surface 20. To this end the guide bars 70 are constructed so that they slope inwardly towards each other in an upward direction to thereby force the plungers inwardly as just stated, and while the rods are being advanced over the surface 20 the plungers are held in their retracted position since the end of each plunger rests against a vertical wall 71 best shown in Fig. 11. This construction is important since it is necessary to retain the plungers 27 in their retracted position until the rod 26 is again presented to the leading end of the tray to which it is to be secured so that when the plungers are released they will be free to enter the plunger receiving sockets 38. The operating chains 62 which are provided with the fingers 62ᵃ are operated at such a speed that the rod advanced by a pair of fingers will reach the right-hand end of the supporting surface 20 at the same time that a tray 10 reaches this position. It is desirable to provide means for forcing a rod 26 downwardly upon reaching the end of the surface 20 in order that the plungers at the end of this rod may snap into the pockets 38, and to this end the camming elements 72 are provided at the right-hand end of the surface 20 and they serve to force the rod 26 downwardly, as will be apparent from Fig. 2.

The cam operating shaft 48 and rod advancing chains 62 are driven in timed relation with the tray operating mechanism by the sprocket chain 73 which engages the driving sprocket 74 and which drives the sprocket 75. A transversely extending shaft 76 is driven from the sprocket 75 by the meshing gears 77 and 78. A sprocket chain 79 serves to drive the cam shaft 48 from the shaft 76 and the rod advancing chains 62 engage sprockets 80 which are mounted upon and are driven by the shaft 76.

It is desirable to keep the plaques taut as they are drawn upwardly from their trays and over the supporting surface 20, and to this end the sliding plate 63 is provided with several resilient fingers 81 which are supported by brackets 82 which are secured to and extend downwardly from the sliding plate 63, and these flexible fingers 81 are adapted to press the plaque 21 against a fixed plate 83, as clearly shown in Fig. 7. This plate may be secured to the casing 84 which encloses the conveyor apron 22.

The apron 22 should be driven in timed relation with the tray operating mechanism in order to properly place the confections upon the plaques 21, and the confections 23 are preferably so placed upon the apron 22 that a gap is formed between the confections upon the apron at a point which will reach the delivery end of the apron 22 at the moment the rod 26 is being elevated. This is desirable as it prevents the confections from being delivered at the time one plaque is being removed and another is being presented to the confection receiving position. The rod advancing chains 61 should travel somewhat faster than the tray advancing chains 11 in order that the rod and tray will reach the right-hand end of the supporting surface 20 at the same time.

The mechanism so far described constitutes an extremely satisfactory machine for removing flexible plaques from their trays, depositing freshly coated conveyors upon the plaques, and then returning the plaques to the trays, all of which is done without interrupting the continuous travel of the trays. In addition to the desirable features of the present invention so far described, the construction whereby the plaques 21 are removably attached to the trays serves also as a convenient means for removing the confections from the trays after the coating upon the confections has been sufficiently cooled or dried. The means by which the cooled confections are removed from the continuous traveling trays will now be described.

Referring to Fig. 12 it will be seen that the loaded plaques are applied to the trays 10 as these trays pass out from under the plaque supporting surface 20. The loaded trays then travel along the upper run 85 of the endless conveyor which may have any desired length, and the trays upon reaching the end of this upper run pass downwardly to the second run 86. The trays 10 are in this manner advanced back and forth along a desired number of runs by the side chains 11, and as the trays pass downwardly from one run to another they are maintained in a horizontal position by any suitable means such, for example, as disclosed in the Greer patent above mentioned. The trays 10 upon reaching the run 87, which is the lowest run occupied by the loaded trays, travel in the direction indicated by the arrows until they reach the sprockets or rollers 88 and thereupon the side chains 11 pass upwardly about the upper guide sprockets or rollers 89, and as the trays 10 are carried upwardly from the sprockets 88 to the sprockets 89 they are held in a horizontal position by the engagement of the side lugs 13 of the tray with the inclined guide bars 90. As the trays 10 pass around the upper sprockets 89 they move in a left-hand direction along the guideway 91 and then pass upwardly around the sprockets 92 to travel along the upper or unloading run 93.

As the loaded trays travel along the unloading run 93 the bar 26 secured to the forward end of a plaque 21 is engaged by the rotating arms 94 which are rigidly secured in spaced relation to each other upon the shaft 95 which shaft is supported by the bearings 96. The arrangement is such that the rod receiving notch at the lower end of each arm 94 is moved into engagement with a plunger 27 of the rod, whereupon the rod 26 is transferred from a tray 10 to the inclined plaque supporting surface 97. As soon as the rod 26 is transferred from its tray to the plate 97 it is engaged by the fingers 98 upon the driving chains 99 disposed at the opposite sides of the plaque supporting plate 97, the fingers 98 being similar in construction and operation to the rod advancing fingers 62ª above described. The fingers 98 upon the driving chains 99 move the loaded plaque 21 along the inclined surface 97 and then downwardly about the drum or roller 100 at the right-hand end of the plate 97. The arrangement is such that as the loaded plaques are directed downwardly about the curved surface of the drum 100 by the driving chains 99, the dried confections are disengaged from the surface of the plaque, as will be apparent from Fig. 13, whereupon they drop upon the endless belt 101. The left-hand end of the belt 101, it will be noted, passes around a relatively narrow belt-supporting bar 102, which bar is so positioned that it extends slightly under the roller 100, the arrangement being such that the confections will be sure to drop upon the upper surface of the belt 101 as they are disengaged from the plaque 21. It will be understood that the coating upon the confections being handled by the unloading mechanism of Fig. 13 is dry and hard so that it is no longer necessary to handle the confections with the care that must be exercised when they are freshly coated. These confections are therefore not injured by dropping upon the upper belt 101, nor are they injured by falling from the discharge end of this belt into a receptacle 103 as the belt passes around its driving roller 104.

The plaques 21 are led downwardly from the roller 100 to the tray 10 which is passing under the plaque supporting surface 97 in order that the rod at the forward end of the plaque may be again attached to its tray 10. Before the ends of the rod 26 may again be inserted in the pockets 38 of a tray, the plungers 27 must be retracted and this is accomplished by providing the guides 105 which project downwardly from adjacent the roller 100 and which slope towards each other in a downward direction to thereby compress the plungers and direct the ends 27 into the pockets 38 to apply an unloaded plaque to its tray. It will be understood that the rod lifting arms 94 and rod advancing chains 99 are driven in timed relation with the other operating parts of the conveyor machine.

Although the machine forming the subject matter of the present invention is designed more particularly to handle freshly coated confections, it may readily be employed to handle various other articles which are likely to be injured or marred unless they are carefully transferred from one conveyor to another.

What is claimed is:—

1. A machine of the class described, comprising in combination, a series of trays, means for advancing the trays along a predetermined path, flexible plaques carried by the trays, a plaque supporting surface positioned along said path, means adapted to engage the forward end of each plaque as it reaches a predetermined position and operable to lift the plaque and advance it over said surface, means for depositing articles upon each plaque as it travels over said surface, and means for transferring the loaded plaque from said support onto a traveling tray.

2. A machine of the class described, comprising in combination, a series of trays, means for advancing the trays along a predetermined path, flexible plaques carried by the trays, means for removably securing the forward end of a plaque to a tray, means for disengaging the forward end of a plaque from its tray and for removing the plaque from the tray, and means for attaching the forward end of the plaque to a tray and for placing the plaque on the tray.

3. A machine of the class described, comprising in combination, a series of trays, means for advancing the trays along a predetermined path, flexible plaques upon the trays, means for temporarily removing the plaques from the trays, means for depositing articles upon the plaques while they are removed from the trays, and means for returning the loaded plaques to the trays.

4. A machine of the class described, comprising in combination, a series of trays, means for advancing the trays along a predetermined path, plaques upon the trays, a plaque supporting surface adjacent said path, means for transferring a plaque from a tray to said surface and for advancing the plaque over said surface, means for placing articles upon the plaque as it travels over said surface, and means for placing a loaded plaque upon a tray.

5. A machine of the class described, comprising in combination, a series of trays, means for advancing the trays along a predetermined path, plaques upon the trays, a plaque supporting surface adjacent said path, means for directing the forward end of each plaque upwardly over said surface as the trays successively reach a predetermined position, means for depositing articles upon the plaques while they are removed from the trays, and means for placing the loaded plaques upon the trays.

6. A machine for transferring articles from a moving apron to traveling trays, comprising in combination, a series of trays, means for advancing the trays along a predetermined path, plaques upon the trays, a plaque supporting surface mounted adjacent the delivery end of an article conveying apron, means for lifting a plaque from its tray and for drawing it around the edge of said support and over the surface of the support to facilitate the transfer of the articles from the apron to the plaque, and means for transferring a loaded plaque from said support to a tray.

7. A machine of the class described, comprising in combination, a series of trays, means for advancing the trays along a predetermined path, flexible plaques for the trays, a plaque supporting surface, means for depositing articles upon the plaques while they are supported by said surface, and means for placing the loaded plaques upon the trays.

8. A machine of the class described, comprising in combination, a series of trays, means for advancing the trays along a predetermined path, flexible plaques for the trays, a supporting surface comprising a thin plate that is mounted above and which lies in close proximity to the upper face of a tray as the latter passes out from under said plate, means for depositing articles upon the plaques, and means for sliding the loaded plaques from said thin plate onto the surface of the trays.

9. A machine of the class described, comprising in combination, a series of trays, means for advancing the trays along a predetermined path, plaques for the trays and each plaque having a bar attached to its forward end, means engageable with said bar and operable to temporarily remove a plaque from its tray, means for depositing articles upon the plaque while it is removed from the tray, and means for attaching the bar of a loaded plaque to a tray to cause the movement of the tray to pull the plaque onto the tray.

10. A machine of the class described, comprising in combination, a series of trays, means for advancing the trays along a predetermined path, flexible plaques for the trays, a plaque supporting surface positioned near said path, means for depositing articles upon the plaques while they are removed from the trays, and means for securing the forward end of a loaded plaque to a tray to cause the movement of the tray to pull the plaque off said support onto the tray.

11. A machine of the class described, comprising in combination, a series of trays, means for advancing the trays along a predetermined path, flexible plaques for the trays, an article conveying apron, a plaque supporting surface mounted near the delivery end of said apron, means for pulling a plaque from a tray upwardly through the space between the conveyor apron and said supporting surface, and a sliding plate for varying the width of said space to facilitate the transfer of articles from the apron to the plaque.

12. A machine of the class described, comprising in combination, a series of trays, means for advancing the trays along a predetermined path, flexible plaques for the trays, an article conveying apron, a plaque supporting surface mounted near the delivery end of said apron, means for pulling the forward end of a plaque from a tray upwardly through the space between the conveyor apron and said supporting surface, a sliding plate extending from said surface to a position of close proximity to the discharge end of the apron to facilitate the transfer of articles from the apron to the plaque, and means for moving said plate away from said apron to clear the leading end of a plaque as the latter is pulled upwardly from its tray.

13. A machine of the class described, comprising in combination, a series of trays, means for advancing the trays along a predetermined path, flexible plaques for the trays, a plaque supporting surface positioned above said path, plaque lifting elements operable in timed relation with the tray advancing means and adapted to engage the forward end of a plaque and elevate it to a position to be advanced over said surface, and means for moving the plaque over said surface.

14. A machine of the class described, comprising in combination, a series of trays, means for advancing the trays along a predetermined path, flexible plaques for the trays, a plaque supporting surface positioned above said path, reciprocating hooks constructed and arranged to engage the plaques and draw them up toward the supporting surface, and means for advancing the plaques over said surface.

15. A machine of the class described, comprising in combination, a series of trays, means for advancing the trays along a predetermined path, plaques upon the trays, a plaque supporting surface mounted above said path, each plaque having a rod secured to its forward end, hooks operable to engage the rods and lift the plaques when the trays reach a predetermined position, means for advancing the lifted plaques over said surface, and means for placing articles on the plaques while they are removed from the trays.

16. A machine of the class described, comprising in combination, a series of trays each having a pair of spaced rod-receiving pockets, plaques for the trays, rods secured to the plaques and constructed to have their ends frictionally held in said pockets to retain the plaques in place upon the trays, means adapted to engage the rods to remove the plaques from the trays, and means for forcing the ends of the rods into the pockets of a tray to attach the plaques to the tray.

17. A machine of the class described, comprising in combination, a series of trays, means for advancing the trays along a predetermined path, plaques for the trays and each having a rod secured to its forward end, a plaque supporting surface mounted adjacent said path, means for transferring a rod from a tray to said surface, means for engaging the rod and advancing it over said surface, means for depositing articles upon a plaque as it is advanced over said surface by its rod, and means for attaching the rod of a loaded plaque to a tray.

18. A machine of the class described, comprising in combination, a series of trays, means for advancing the trays along a predetermined path, plaques for the trays and each having a rod secured to its forward end, a plaque supporting surface mounted above said path, means for transferring a rod from a tray to said surface, and guides extending downwardly from said surface and adapted to guide the rods while they are transferred from a tray to said surface.

19. A machine of the class described, comprising in combination, a series of trays, means for advancing the trays along a predetermined path, plaques for the trays, a plaque supporting surface mounted above said path, means for pulling the forward end of a plaque upwardly from its tray and over said surface, and yielding means adapted to engage and tension the plaque as it is drawn over said surface.

20. A machine of the class described, comprising in combination, a series of trays, means for advancing the trays along a predetermined path, flexible plaques for the trays, a plaque supporting surface positioned above said path, means for removing the plaques from the trays as they approach said surface and for advancing the plaques over the surface as the trays pass under the surface, and means for applying the plaques to the trays as they pass out from under said surface.

21. A machine of the class described, comprising in combination, a series of trays, means for advancing the trays along a predetermined path, flexible plaques for the trays, means for temporarily removing the plaques from the trays, means for depositing articles upon the plaques while they are removed from the trays, means for returning the loaded plaques to the trays, and said different means being operable during the continuous travel of the trays.

22. In combination with a machine having trays for conveying semi-hard or coated articles through a drying chamber, flexible plaques for the trays, means for removing the plaques from the trays, means for depositing articles upon the plaques and applying the loaded plaque to the trays, and mechanism for removing the articles from the trays consisting of means for removing the plaques from the trays and advancing them along a curved path to dislodge the articles from the plaques.

23. In combination with a machine having trays for conveying semi-hard or coated articles through a drying chamber, flexible plaques for the trays, means for depositing articles upon the plaques, means for placing the loaded plaques upon the trays, means for removing the loaded plaques from the trays, means for directing the plaques along a curved path to dislodge the articles from the plaques, and means for placing the unloaded plaques upon the trays.

24. In combination with a machine having traveling trays, flexible plaques for the trays, a plaque supporting surface mounted adjacent the path of the trays, and mechanism for removing articles from the traveling trays, consisting of means for engaging a loaded plaque and pulling it from its tray onto said surface, and means for advancing the plaque over said surface and along a curved path to dislodge the articles from the plaque.

25. In combination with a machine having traveling trays, flexible plaques for the trays, a plaque supporting surface having an end extending into close proximity to the path traveled by said trays, means for transferring the forward end of a plaque from a tray to said surface, and means for advancing the plaque along said surface.

26. In combination with a machine having traveling trays, flexible plaques for the trays, a plaque supporting surface having an end extending into close proximity to the path traveled by said trays, means for transferring the forward end of a loaded plaque from a tray to said surface, means for advancing the plaque along said surface, and means for dislodging articles from the plaques while the latter are removed from the trays.

27. In combination with a machine having traveling trays, flexible plaques for the trays, a plaque supporting surface having an end extending into close proximity to the path traveled by said trays, means for transferring the forward end of a loaded plaque from a tray to said surface, and for advancing the plaque along said surface, means for dislodging articles from the plaque, and means for placing the unloaded plaque upon a tray.

28. In combination with an article supporting tray, a flexible plaque for covering the face of the tray, a rod secured to one end of the plaque, and rod engaging means at the forward end of the tray and constructed to frictionally hold the rod to thereby retain the plaque in place upon the tray.

29. In combination with an article supporting tray, a flexible plaque for covering the face of the tray, a rod secured to the plaque, and having yielding plungers at its opposite ends, and plunger engaging elements on said tray and provided with pockets adapted to yieldingly hold said rod to thereby retain the plaque in place upon the tray.

30. A machine of the class described, comprising in combination, a series of flexible plaques, means for supporting and advancing the plaques along a predetermined path, a plaque supporting surface disposed adjacent said path, power actuated means for successively removing the plaques from said supporting and advancing means and operable to advance the plaques over said surface and then return them to said supporting and advancing means, and means for depositing articles upon the plaques while they are advanced over said surface.

31. A machine of the class described, comprising in combination, a series of flexible plaques, means for supporting and advancing loaded plaques along a predetermined path, a plaque supporting surface disposed adjacent said path, mechanism for successively removing the loaded plaques from said supporting and advancing means and operable to advance the plaques over said surface and then return them to said supporting and advancing means, and means for removing from the plaques the articles resting thereupon while the plaques are removed from said supporting and advancing means.

32. A machine of the class described, comprising in combination, a series of trays, means for advancing the trays along a predetermined path, flexible plaques carried by the trays, a bar for securing the forward end of a plaque to a tray and having yielding end portions adapted to secure the bar to a tray, a plaque supporting surface mounted adjacent said path, means for successively removing the plaques from the trays to advance the plaques over said surface and then return them to the trays, and means for retracting the yielding end portions of the bars while the bars are removed from the trays to facilitate engagement of the ends of a bar with the tray to which it is to be secured.

33. A machine of the class described, comprising in combination, a series of trays, means for advancing the trays along a predetermined path, flexible plaques carried by the trays, a bar for securing the forward end of each plaque to a tray, a plaque supporting surface mounted above the path of the trays, means for successively removing the plaques from the trays to advance them over said surface, and means adjacent the delivery end of said surface for forcing the bars downwardly into engagement with the trays to effect the return of the plaques to the trays.

34. A machine of the class described, comprising in combination, a series of trays, means for advancing the trays along a predetermined path, flexible plaques carried by the trays, a plaque supporting surface mounted adjacent the path of the trays, means for engaging the forward end of each plaque to remove it from its tray and advance it over said surface, means for tilting the forward end of each tray as it reaches a predetermined position to facilitate the engagement of the plaque removing means with the forward end of each plaque, and means for returning the plaques to the trays.

35. A machine of the class described, comprising in combination, a tray, means for advancing the tray along a predetermined path, a plaque for the tray, power actuated means for temporarily removing the plaque from the tray, means for depositing articles upon the plaque while it is removed from the tray, and means for returning the loaded plaque to the tray.

36. A machine of the class described comprising in combination, a series of flexible plaques, means for supporting and advancing the plaques along a predetermined path, a plaque supporting surface disposed adjacent said path, means for successively removing the plaques from said supporting and advancing means and operable to bend each plaque about the edge of said supporting surface and to advance it over said surface, means for depositing articles upon the plaques while they are removed from said supporting and advacing means, and means for returning the loaded plaques to said supporting and advancing means.

37. A machine of the class described, comprising in combination, a series of plaques, means for supporting and advancing the plaques along a predetermined path, means for successively removing the plaques from said supporting and advancing means, means for placing deposits upon the plaques while they are removed from said supporting and advancing means, and means for returning the loaded plaques to the supporting and advancing means.

38. A machine of the class described, comprising in combination, an article conveying apron, a series of plaques, means for supporting and advancing the plaques along a predetermined path, means for successively removing the plaques from said supporting and advancing means and for feeding them in close proximity to the discharge end of said apron to receive deposits therefrom, and means for returning the loaded plaques to said supporting and advancing means.

In testimony whereof, we have signed our names to this specification.

JESSE W. GREER.
FREDERICK W. GREER.